United States Patent [19]

Barnaby

[11] Patent Number: 4,794,289
[45] Date of Patent: Dec. 27, 1988

[54] BEARING STRUCTURES

[75] Inventor: Anthony B. Barnaby, Leicestershire, United Kingdom

[73] Assignee: Rank Taylor Hobson Limited, England

[21] Appl. No.: 891,397

[22] Filed: Jul. 29, 1986

[30] Foreign Application Priority Data

Aug. 2, 1985 [GB] United Kingdom ............... 8519460

[51] Int. Cl.⁴ .................................. H02K 5/16
[52] U.S. Cl. ..................... 310/90; 310/268; 310/DIG. 6; 384/121; 384/134
[58] Field of Search .......... 310/90, 90.5, 268, DIG. 6; 138/26; 384/134, 300, 121, 126, 123, 273, 466; 433/132

[56] References Cited

U.S. PATENT DOCUMENTS

| 2,455,970 | 12/1948 | Balke | 308/137 |
|---|---|---|---|
| 3,012,827 | 12/1961 | Goetz | 384/126 |
| 3,023,334 | 2/1962 | Burr | 310/DIG. 6 |
| 3,023,335 | 2/1962 | Burr | 310/DIG. 6 |
| 3,026,154 | 3/1962 | Marchand | 384/126 |
| 3,302,986 | 2/1967 | Grolman et al. | 308/174 |
| 3,440,887 | 4/1969 | Athanas | 73/432 |
| 3,759,588 | 9/1973 | Anderson | 384/126 |
| 3,857,051 | 12/1974 | Seichter et al. | 310/36 |
| 4,224,165 | 9/1980 | Laven et al. | 210/363 |
| 4,260,205 | 4/1981 | Spies | 308/9 |
| 4,320,927 | 3/1982 | Sertich | 310/90.5 |
| 4,385,845 | 5/1983 | Hoshino | 384/123 |
| 4,394,091 | 7/1983 | Klomp | 384/126 |
| 4,422,697 | 12/1983 | Gugel et al. | 308/175 |
| 4,588,360 | 5/1986 | Tuckey | 138/26 |
| 4,652,148 | 3/1987 | Olasz | 310/90 UX |

FOREIGN PATENT DOCUMENTS

| 0038623 | 10/1981 | European Pat. Off. | |
| 2255510 | 7/1975 | France. | |
| 2462806 | 2/1981 | France. | |
| 0301895 | 9/1954 | Switzerland | 384/126 |
| 1452280 | 10/1976 | United Kingdom. | |
| 1458100 | 12/1976 | United Kingdom. | |

OTHER PUBLICATIONS

Taylor-Hobson "Talycenta" Advanced Form Measuring System Brochure 1980.

Primary Examiner—R. S. Skudy
Attorney, Agent, or Firm—Lerner, David, Littenberg, Krumholz & Mentlik

[57] ABSTRACT

A bearing structure, preferably for supporting a rotary table (4) in metrological apparatus, includes both a journal bearing (34,36,38) and a thrust bearing (56,66). The journal bearing is made up of three dry pads (34,36,38), one (38) of which is radially adjustable, and the thrust bearing (56,66) comprises first and second air bearings. The axis of rotation of the bearing is vertical, and the lower (66) of the air bearings is less stiff than the upper one (56).

15 Claims, 5 Drawing Sheets

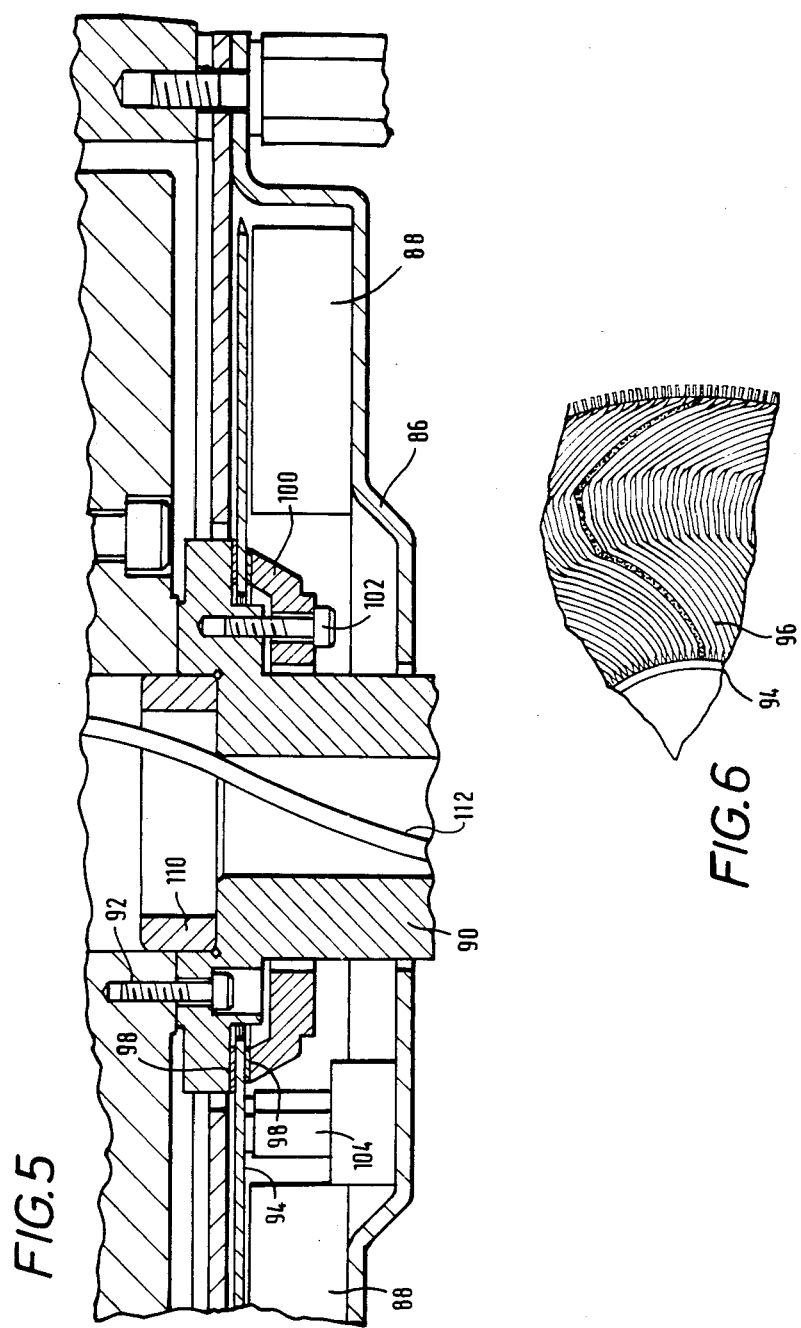

BEARING STRUCTURES

This invention relates to bearing structures and is particularly but not exclusively applicable to bearing structures for rotary workpiece support tables in metrological apparatus, such as rate tables, angular measuring systems and apparatus for the measurement of profile errors including roundness, straightness and surface texture.

There is a need for a precision bearing, for example for the rotary workpiece support table in metrological apparatus, which is capable of supporting a relatively high load, is stiff in the sense of substantially preventing radial, axial and angular displacements of the member supported by the bearing, provides low friction so that the member is freely rotatable and provides vibration damping. Various forms of bearings have been proposed in metrological apparatus in the past. For example in one bearing structure which has been in commercial production, the vertically disposed shaft of a workpiece support table has been supported at its bottom end by a hemispherical dry thrust bearing and near its upper end by a journal comprising dry pads engaging the cylindrical surface of the shaft. This dry bearing structure suffers from the problem that it has only a low load bearing capacity and that the shaft has to be longer than is desirable to provide the required accuracy.

Oil hydrostatic bearings have also been proposed. In one example of such a bearing, oil is continuously pumped into the space between conical surfaces provided on the shaft and a surrounding stationary support member. Although this type of bearing is capable of supporting high loads, it is extremely expensive as it requires a considerable amount of ancilliary equipment such as a pump, a reservoir for the oil and associated piping.

Also, air bearings have been used but these are unstable so that in metrological apparatus high coning errors would be introduced particularly if the load is offset relative to the axis of rotation of the workpiece support table.

In one preferred aspect of the present invention, there is provided a composite bearing in which first and second members are supported for relative rotation, a bearing of a first type being provided to constrain said members against axial movement and a bearing of a second type being provided to constrain said members against radial movement. In a preferred embodiment, the bearing of the first type is an air bearing and the bearing of the second type is a dry friction bearing.

In the preferred embodiment of the invention, there is provided a bearing structure comprising air bearing means constraining first and second relatively rotatable members against axial movement and a bearing of a different type constraining said members against radial movement.

In a further alternative aspect of the present invention, there is provided a composite bearing comprising first and second relatively rotatable members having radially extending bearing surfaces and cylindrical bearing surfaces with dry friction bearing means acting between the cylindrical surfaces and air bearing means acting between the axial surfaces.

With the preferred embodiment of the invention, a bearing structure having low friction, high stiffness, a high level of stability and a high level of vibration damping may be provided at relatively low cost.

The invention is described further by way of example with reference to the accompanying drawings in which:

FIG. 5 is a section, similar to FIG. 2, but showing parts of the apparatus, including an electric motor, in more detail; and FIG. 6 illustrates part of the winding of the motor shown in FIG. 5.

Figure 1:
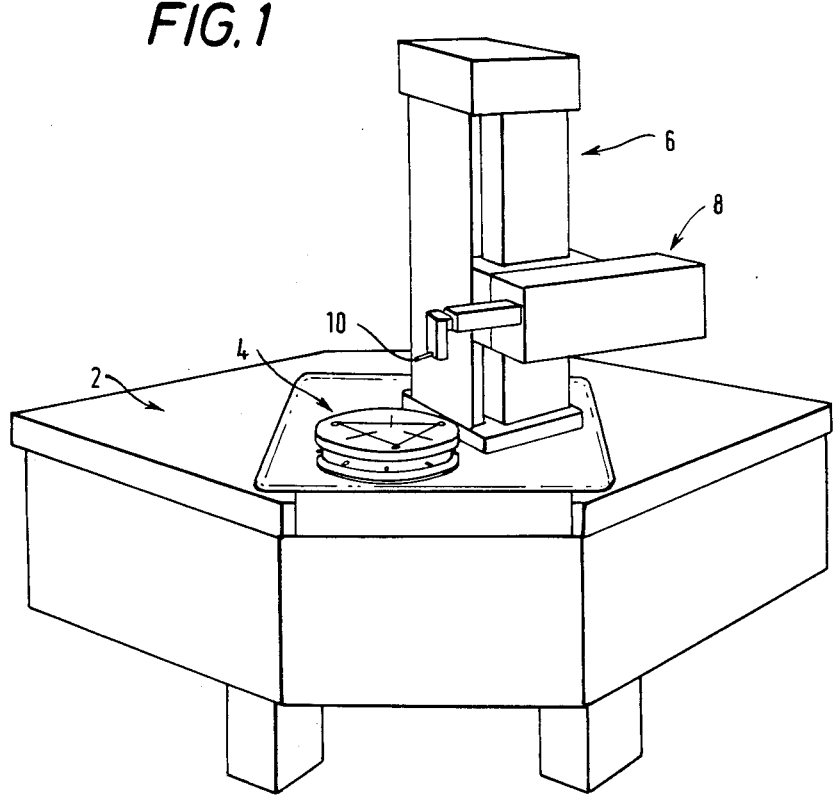
FIG. 1 is an embodiment of a diagrammatic perspective view of a metrological apparatus in accordance with the present invention.

With reference to FIG. 1, the metrological apparatus, which is particularly for measuring roundness, comprises a bench 2 within which is a chassis structure (not shown) supporting a turntable 4 by means of a bearing to be described in detail with reference to FIGS. 2 to 5. The turntable 4 is for supporting a workpiece whose surface is to be measured. A column 6 is also supported on the chassis structure adjacent the turntable 4. A carriage 8 is mounted on the column 6 for vertical movement and supports a transducer (not shown), which may for example be inductive, to which a stylus 10 is connected. In operation of the apparatus shown in FIG. 1, a workpiece is mounted on the turntable 4 so that it may be rotated, by rotation of the turntable 4, relative to the stylus 10 which is positioned in contact with the workpiece surface to be measured. Alternatively, a non-contact transducer may be employed. The apparatus also includes signal processing means (not shown) for processing the signal output by the transducer in order to provide information as to the characteristics, such as the roundness, of the workpiece.

Figure 2:
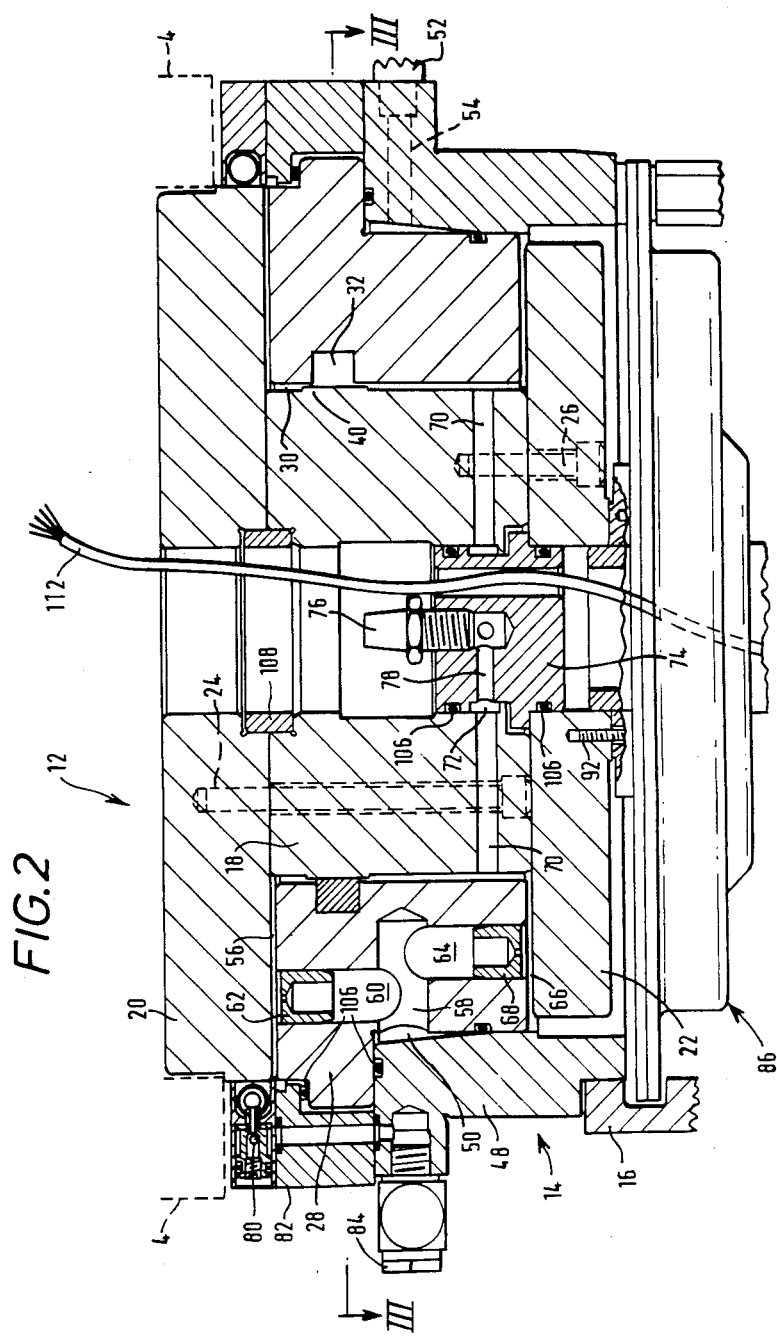
FIG. 2 is a cross-sectional view of a bearing structure, in accordance with a preferred embodiment of the invention.

The bearing structure upon which the turntable 4 is mounted is shown in section in FIG. 2. It comprises a rotor 12 supported for rotation about a vertical axis by a stator 14 which is fixed relative to the chassis of the apparatus indicated diagrammatically at 16. The rotor 12 and stator 14 are respectively the rotational and stationary parts of the bearing. The rotor 12 comprises a spindle 18 and upper and lower discs 20,22 secured to the spindle 18 by bolts 24 and 26 (only one each of which is shown in FIG. 2).

Figure 3:
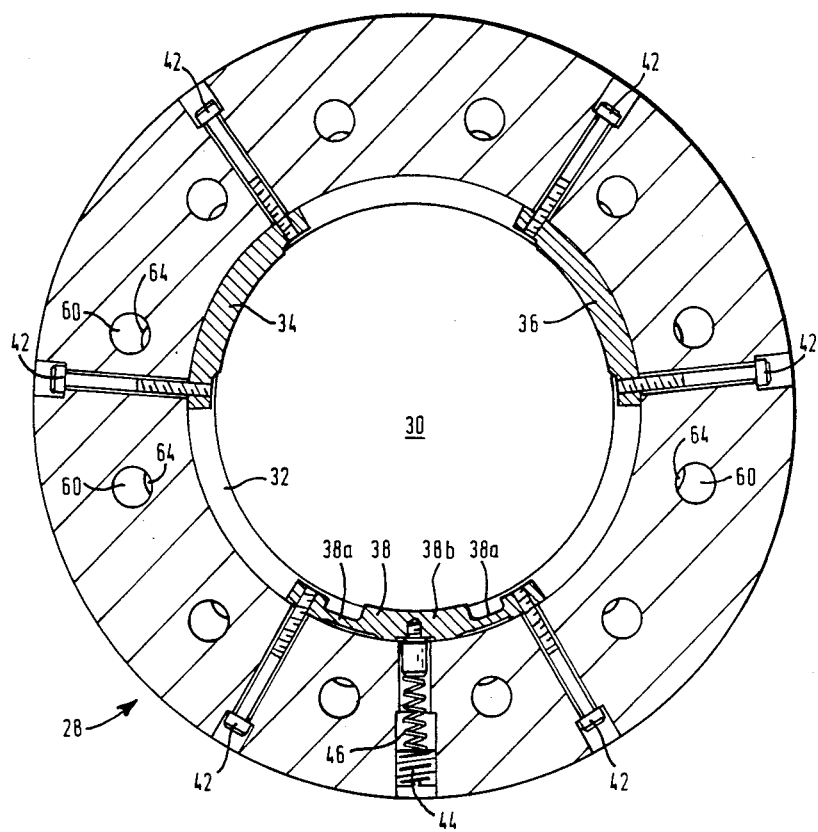
FIG. 3 is a section on the line III—III, but with various parts omitted.
Figure 4:
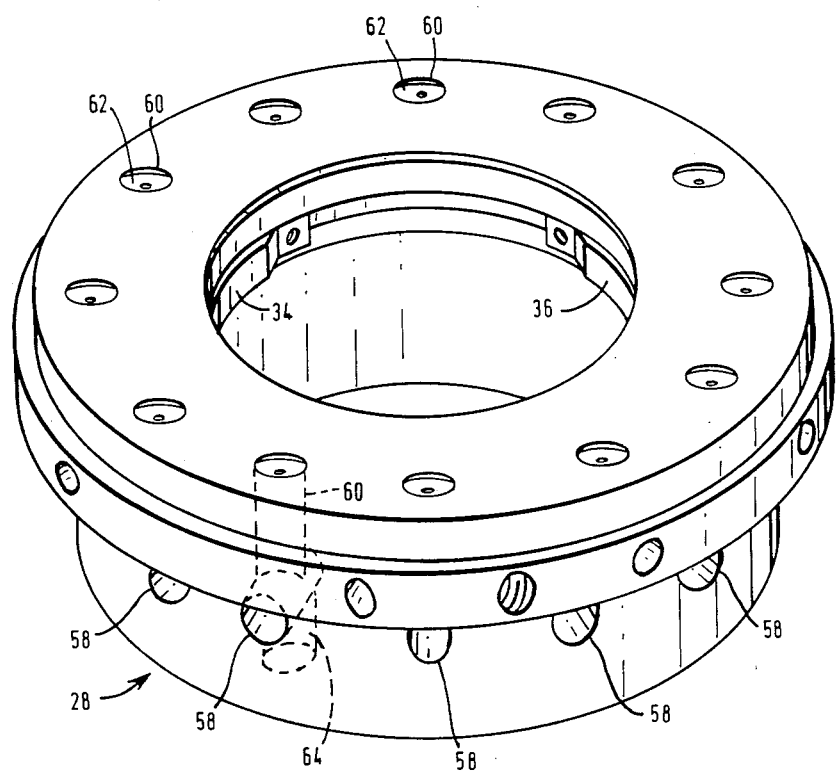
FIG. 4 is a perspective view of part of the apparatus of FIGS. 2 and 3.

The stator comprises a member 28, which is also shown in FIGS. 3 and 4, having a cylindrical bore 30 in which the spindle 18 is located. An annular recess 32 is formed in the bore 30 near to the upper end and contains three dry friction bearing elements 34, 36 and 38 which are made of a low friction plastics material, such as an acetal copolymer with a PTFE filler and which engage an annular shoulder 40 formed on the spindle 18, to constrain the spindle against radial movement. The elements 34, 36 and 38 are disposed at equiangularly spaced positions and are secured in place by bolts 42. The element 38 includes two thin portions 38a which permit the central portion 38b to move radially. An adjusting screw 44 and compression spring 46 are arranged in the member 28 for adjusting the force with which the centre portion 38b of the element 38 is pressed against the spindle 18. The elements 34, 36 and 38 accurately define the radial position of the spindle 18 whilst permitting the spindle 18 to rotate relative to the member 28.

The stator 14 includes a further member 48 which is secured to and surrounds the lower portion of the member 28. An annular air supply channel 50 is defined between the members 28 and 48 and is connected to an air supply line 52 through a radial bore 54 formed in the member 48. The channel 50 is connected to the space 56 between the upper, radially extending surface of the member 28 and the lower, radially extending surface of the disc 20 through blind radial bores 58 and upwardly directed bores 60 formed in the member 28 to form an air bearing in the radially extending space between the upper surface of the member 28 and the lower surface of the disc 20. Flow restrictors 62 are provided in the bores 60. Downwardly directed bores 64 communicating with the blind bores 58 are also formed in the member 28 to provide an air bearing in the radially extending space 66 between the lower radial surface of the member 28 and the upper surface of the disc 22. The bores 64 contain flow restrictors 68 and are positioned slightly radially inwardly relative to the bore 60 so that the stiffness of the air bearing in the space 66 is less than that in the space 56. The width of the spaces 56 and 66 is preferably in the range 10-15 microns, for example 12 microns, so that the air bearings effectively and stably constrain the rotor 12 against axial movement relative to the member 28 of stator 14. The lower bearing prevents vertical vibration of the rotor.

The air in the spaces 56 and 66 may move both radially inwardly and radially outwardly. The air which moves radially inwardly is exhausted through passages 70 which extend radially through the spindle 18 to an annular space 72 formed between the inside surface of the spindle 18 and an exhaust block 74 mounted inside the spindle 18. The space 72 is connected to an exhaust 76, which includes a silencer (not shown), by a passage 78 in the block 74.

An inflatable clamp 80 is mounted on a structure 82 which is secured to the members 28 and 48 inflatable clamp 80 surrounds the disc 20 and may be inflated by supplying fluid, such as air, to it through passages 84 to clamp the rotor 12 relative to the stator 14. The purpose of clamp 80 is to selectively hold the turntable stationary, e.g., when mounting a workpiece thereon. During operation of the apparatus, clamp 80 is released so that the turntable may be rotated.

A housing 86 (FIGS. 2 and 5) secured to the bottom of the stator 14 contains a single DC electric motor. The motor comprises an annular magnet 88 fixed in the housing 86 and comprising alternately arranged north and south poles, a shaft 90 which is secured by bolts 92 to the disc 22 of the rotor 12, and an insulating disc 94 having conductors 96 formed thereon in the manner of a printed circuit, which conductors 96 constitute the windings of the motor. The shape of the conductors 96 can be seen in FIG. 6. The disc 94 is clamped tightly between insulating rings 98 by means of a spigot 100 which is secured to the shaft 90 by bolts 102 so that the disc 94 is fixed relative to the shaft 90. Power may be supplied to the winding 96 by brushes 104 fixed inside the housing 86. Thus, the motor shaft 90 forms an extension of the spindle 18 which may therefore be directly driven by the motor. Preferably, the motor is arranged to rotate at between 0.03 and 10 rpm.

Air seals 106 are provided between various parts of the rotor and stator. A centring ring 108 is provided between the disc 20 and the spindle 18 and a further centring ring 110 is provided between the shaft 90 and disc 22. A multicore electric cable 112 extends through the centre of the rotor 12 and the motor shaft 90 for supplying power and control signals to the turntable 4 for centring and levelling the turntable by means (not shown). Power and signals are supplied to the cable 112 via a slip ring arrangement which cooperates with the lower end of the motor shaft 90.

The structure described with reference to FIGS. 2 to 6 of the drawings is relatively inexpensive, is capable of supporting a high load, is stable and well damped and the direct motor drive ensures that unwanted vibrations, such as may arise when a belt drive is used, are avoided.

Various modifications are possible within the scope of the invention. For example, although in the preferred embodiment, the bearing is mounted to provide for rotation about a vertical axis, it could be arranged at a different attitude, such as to provide rotation about a horizontal axis. Although the dry friction bearings have been provided so that they act between an inner surface of the stator and an outer surface of the rotor, the bearing could be redesigned within the scope of the invention so that the dry bearings act between an outer surface of the stator and an inner surface of the rotor. Further, although in the embodiment illustrated the air bearings have been formed between radially extending plane surfaces, it would be possible within the scope of the invention to form the air bearings between conical surfaces. However, the arrangements shown in the drawings in which the air bearing is formed between plane surfaces is preferred since it is simpler and each bearing performs only the single function of constraining in either the radial or the axial direction. Although in the embodiment the air bearings act as thrust bearings and the dry friction bearing is a journal, the embodiment being for an application in which high thrust forces but low radial forces will be encountered, the invention may be applied to an arrangement in which low thrust forces but high radial forces may be encountered, in which case the air bearing is preferably formed as a journal and the dry friction bearing as a thrust bearing. A particular advantage of the arrangement shown in the drawings is that the turntable may be brought to rest without loss of its geometrical position. This is difficult to achieve with prior art bearings.

I claim:

1. A bearing structure comprising:
    a stationary member;
    a rotatable member mounted for rotation about a vertical axis relative to said stationary member;
    first air bearing means acting between said rotatable member and said stationary member and constraining said rotatable member against downward axial movement relative to said stationary member;
    second air bearing means acting between said rotatable member and said stationary member and constraining said rotatable member against upward axial movement relative to said stationary member;
    conduit means for supplying air to said first and second air bearing means for operation thereof; and
    dry low-friction bearing means acting between said rotatable member and said stationary member and constraining said rotatable member against radial movement relative to said stationary member.

2. A bearing structure according to claim 1, further comprising a drive means, said drive means comprising an electric motor having a shaft directly coupled to one of said members for rotating said member relative to the other member.

3. A bearing structure according to claim 2, including an insulating disc secured to the shaft of the motor, and wherein said motor comprises windings having conductors formed as printed circuits on said insulating disc.

4. A bearing structure according to claim 1, wherein said first air bearing means has a higher stiffness than said second air bearing means.

5. A bearing structure according to claim 1, wherein each of said air bearing means comprises a first radially extending annular surface on said stationary member and a second radially extending annular surface on said rotatable member, said annular surfaces facing each other and defining a space therebetween, said space being connected to said conduit means.

6. A bearing structure according to claim 5, wherein one of the annular surfaces of each of said air bearing means has a plurality of apertures therein at positions distributed around said axis, said apertures being connected to said conduit means for supplying air to said space, said apertures in said one of the annular surfaces of said first air bearing means being disposed radially outwardly relative to the apertures in said one of the annular surfaces of said second air bearing means.

7. A bearing structure according to claim 1, wherein said first air bearing means is located at a higher level than said second air bearing means.

8. A bearing structure according to claim 2, wherein said drive means is operable to rotate said member between 0.03 and 10 rpm.

9. A bearing structure according to claim 1, wherein said dry low-friction bearing means is adjustable to provide for adjustment of the position of the rotary axis of the rotatable member relative to the stationary member.

10. A bearing structure comprising:
first and second members supported for rotation relative to each other;
air bearing means constraining said members against relative axial movement; and
dry low-friction bearing means constraining said members against relative radial movement, said dry low-friction bearing means comprising three bearing elements at angularly spaced apart positions, two of said elements being fixed and the third being radially adjustable.

11. A structure according to claim 10, wherein said air bearing means acts between radially extending plane surfaces of said members.

12. A structure according to claim 10, wherein said air bearing means comprises first and second air bearings one of which constrains said members against relative axial movement in one direction and the other of which constrains said members against relative axial movement in the opposite direction.

13. A structure according to claim 12, wherein the stiffness of one of said air bearings is less than that of the other.

14. A structure according to claim 13, mounted with the axis of rotation vertical and wherein the air bearing having the greater stiffness is uppermost.

15. A bearing structure comprising:
a rotatable member;
a stationary member supporting said rotatable member for rotation about a vertical axis;
air bearing means operable to constrain said rotatable member against axial movement relative to said stationary member; and
dry low-friction bearing means constraining said rotatable member against radial movement relative to said stationary member, said dry low-friction bearing means being adjustable for adjusting the position of the rotary axis of said rotatable member relative to said stationary member.

* * * * *